US006950682B2

(12) United States Patent
Takeda et al.

(10) Patent No.: US 6,950,682 B2
(45) Date of Patent: Sep. 27, 2005

(54) TRANSCEIVER

(75) Inventors: Takeshi Takeda, Tokyo (JP); Tomoya Atsumi, Tokyo (JP); Mikio Fukuda, Tokyo (JP)

(73) Assignee: Temco Japan Co., Ltd., Tokyo (JP)

(*) Notice: Subject to any disclaimer, the term of this patent is extended or adjusted under 35 U.S.C. 154(b) by 358 days.

(21) Appl. No.: 10/157,951

(22) Filed: May 31, 2002

(65) Prior Publication Data

US 2002/0183014 A1 Dec. 5, 2002

(30) Foreign Application Priority Data

May 31, 2001 (JP) ....................................... 2001-164592

(51) Int. Cl.[7] .................................................. H04B 1/38

(52) U.S. Cl. ................................ 455/569.1; 455/575.6; 379/433.02; 381/151

(58) Field of Search ........................... 455/569.1, 575.2, 455/575.6; 381/151, 326, 380; 600/25; 607/56, 57; 379/433.02, 433.03

(56) References Cited

U.S. PATENT DOCUMENTS 2,151,706 A * 3/1939 Lieber ........................ 381/326
2,678,973 A * 5/1954 Newman .................... 381/151
6,728,374 B1 * 4/2004 Takeda .................. 379/433.02

FOREIGN PATENT DOCUMENTS

WO WO 00/72628 A1 * 11/2000 ............ H04R/1/00

* cited by examiner

*Primary Examiner*—Lee Nguyen
(74) *Attorney, Agent, or Firm*—Browdy and Neimark, P.L.L.C.

(57) ABSTRACT

A low-cost transceiver capable of being connected with a telephone or a radio set is thin and small in size, excellent in easiness in use, stable in mounting condition, and is therefore suited for those who are active in the outdoor work, sports or the like. When a wearer of the transceiver is sweated and/or exposed to dust, a sweat- or dust-damaged component of the transceiver is replaced with a new one. The transceiver comprises: a bone conduction speaker (2); a throat microphone (3); a soft tape-like carrier (1) for supporting both the supporting the speaker (2) and the microphone (3); and, adhesive means (6) for adhesively fixing the carrier (1) to the temporal area covering the ear and the larynx of the wearer.

12 Claims, 4 Drawing Sheets

TRANSCEIVER

BACKGROUND OF THE INVENTION

1. Field of the Invention

The present invention relates to a transceiver intended for voice communication in the outdoors, for example, in a battlefield, at a construction site or in any other noisy and dusty environments, in which a wearer of the transceiver is often sweated all over and/or exposed to dust.

2. Description of the Related Art

Any one of conventional transceivers, which include cell phones and like portable phones as shown in FIGS. 5 to 8, is satisfactory in terms of hand-free usage.

Of these conventional transceivers, one shown in FIG. 5 is provided with an elastic neckband 21, which supports a throat microphone 22 at one of opposite end portions thereof. This throat microphone 22 is adapted to engage with the throat or other vibrating body portion adjacent to the larynx of the wearer. On the other hand, as for the conventional transceiver shown in FIG. 6, this one is provided with an expandable band 23, which is provided with an engaging means such as an adhesive tape or the like in each of its opposite end portions. Through such an engaging means, the throat microphone 22 is attached to the expandable band 23.

As for another conventional transceiver shown in FIG. 7, this one is provided with a headband 24. Attached to each of opposite end portions of the headband 24 is an earmuff 25. Incorporated in one of the earmuffs 25 is a speaker (not shown). Extended from this earmuff 25, in which the speaker is incorporated, is an arm for supporting a microphone 26 at its free end portion. The last one shown in FIG. 8 is provided with a supporting band 27. As is clear from FIG. 8, the supporting band 27 is provided with an earpiece 28 in each of opposite end portions thereof. Extended from the earpiece 28 is an ear engaging bend 30 which has a bone conduction speaker 29 connected with its free end portion. Extended from one of these bends 30 is an arm which supports the microphone 26 at its free end portion in the vicinity of the wearer's mouth.

However, any one of the conventional transceivers is poor in wearability (i.e., stability when worn on the wearer's head), and therefore can't stand most of long-term physical working conditions. Further, the conventional transceiver is designed for the short-term (i.e., throw-away) use not for the long-term use. Consequently, in the conventional transceiver, there is not any idea of replacing a damaged component of the transceiver with a corresponding new component. In other words, due to lack of such an idea of replacement of the components, when the conventional transceiver is damaged, it is necessary to replace the damaged transceiver with a new set of transceiver. In this respect, the conventional transceiver is not economical of maintenance cost.

SUMMARY OF THE INVENTION

Under such circumstances, the present invention was made. Consequently, it is an object of the present invention to provide a transceiver, which is thin and small in size, light in weight, and therefore excellent in wearability and in easiness in use, and is adapted to be used in the outdoors and not expensive, wherein the transceiver is capable of replacing its component with a corresponding new one when its component is damaged by the wearer's sweat and/or dust.

In accordance with the present invention, the above object of the present invention is accomplished by providing:

A transceiver capable of being connected with a telephone or a radio set, comprising: a bone conduction speaker (2); a throat microphone (3); a soft tape-like carrier (1) for supporting the bone conduction speaker (2) and the throat microphone (3); and, adhesive means (9) for adhesively fixing the soft tape-like carrier (1) to a wearer's body area in ear-larynx vicinities of the wearer.

In the transceiver having the above construction, preferably the soft tape-like carrier (1) is provided with an ear engaging bend (8).

Further, preferably an elastic element (7) is interposed between the soft tape-like carrier (1) and at least one of the bone conduction speaker (2) and the throat microphone (3).

Still further, preferably the adhesive means (9) is detachably attached to the soft tape-like carrier (1) so as to be capable of being replaced with a new one.

Further, preferably the soft tape-like carrier (1) is provided with a body engaging surface disposed adjacent to the temporal area of the wears and has each of its opposite longitudinal side edge portions formed into an engaging portion (10) for detachably receiving an adhesive sheet (9) with an adhesive portion (6) therein in an insertion manner.

In the transceiver of the present invention having the above construction, since the carrier (1) for supporting both the bone conduction speaker (2) and the throat microphone (3) is constructed of a soft tape provided with the adhesive portion (6), it is possible for the wearer to wear and firmly hold the transceiver on a desired body portion of the wearer through appropriate press-contact in an easy manner without fail and without any feeling of physical disorder, regardless of physical differences of the wearers. Due to this, the transceiver of the present invention is quite suited for those who are active in the outdoor work, sports or the like.

In addition, the transceiver of the present invention is thin and small in size, light in weight, and simple in construction as described above. Consequently, it is possible to provide the transceiver of the present invention at low cost. Due to this, it is also possible to provide a throw-away type transceiver according to the present invention. Further, in the transceiver of the present invention, it is possible to replace only the adhesive sheet 9 (shown in FIG. 4) with a new one in use. In this case, the remaining components of the transceiver are repeatedly used, which makes the transceiver of the present invention more economical than any one of the conventional transceivers.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

The present invention may, however, be embodied in various different forms and should not be construed as limited to the embodiments set forth herein; rather, these embodiments are provided so that this disclosure will be thorough and complete, and will fully convey the scope of the present invention to those skilled in the art.

Figure 1:
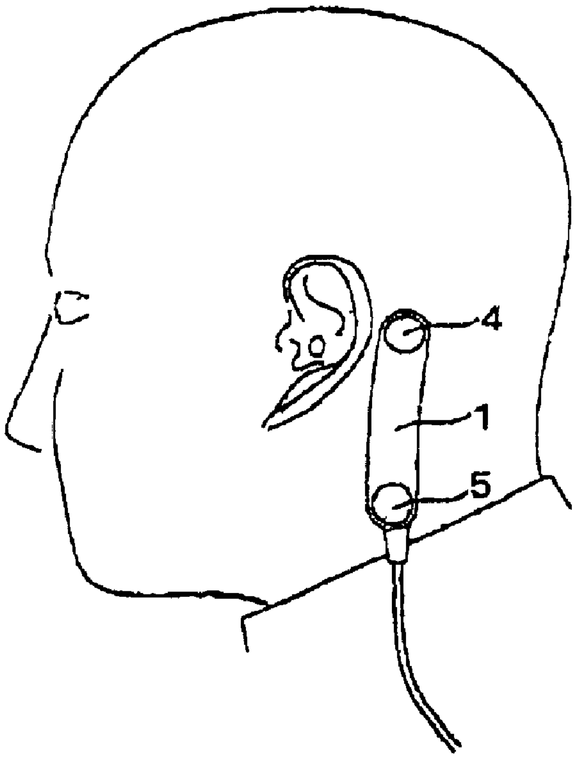
FIG. 1 is a side view of the head of the wearer who wears the transceiver of the present invention, illustrating an embodiment of the transceiver in use.

FIG. 1 shows an embodiment of a transceiver of the present invention, which comprises a soft tape-like carrier 1. As is clear from FIG. 2(C), the carrier 1 is provided with a speaker receiving portion 4 and a microphone receiving portion 5. Received in the speaker receiving portion 4 is a bone conduction speaker 2, which is disposed immediately behind the ear of a wearer, as shown in FIG. 1. On the other hand, received in the microphone receiving portion 5 is a throat microphone 3, which is adapted to engage with the throat or other vibrating body portion adjacent to the larynx of the wearer. In other words, as shown in FIG. 1, the soft tape-like carrier 1 has a length sufficient to cover all the temporal area of the wearer in such a manner that: the bone conduction speaker 2 is brought into appropriate press-contact with the temporal area immediately behind the ear of the wearer; and, the throat microphone 3 is brought into appropriate press-contact with the throat or other vibrating body portion adjacent to the larynx of the wearer.

Figure 2:
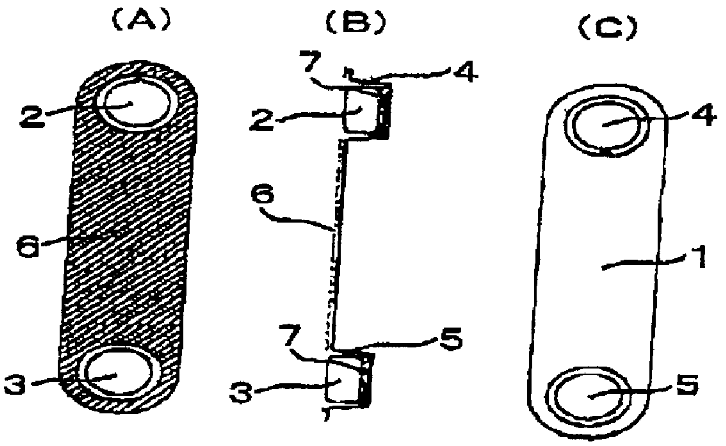
FIG. 2(A) is a rear view of the soft tape-like carrier of the transceiver shown in FIG. 1.
FIG. 2(B) is a longitudinal sectional view of the soft tape-like carrier of the transceiver shown in FIG. 1.
FIG. 2(C) is a front view of the soft tape-like carrier of the transceiver shown in FIG. 1.

As is clear from FIG. 2(B), in shape or contour, the speaker receiving portion 4 corresponds to the bone conduction speaker 2 which is received in the speaker receiving portion 4. In addition, the speaker receiving portion 4 has a depth corresponding to the thickness of the bone conduction speaker 2.

As shown in FIG. 2(B), preferably, an elastic element 7 made of polyurethane foam is disposed on either an inner bottom surface of the speaker receiving portion 4 or an outer bottom surface of the bone conduction speaker 2. The elastic element 7 thus disposed between the speaker receiving portion 4 and the bone conduction speaker 2 is capable of preventing the bone conduction speaker 2 from moving relative to the wearer in use. Further, due to the resiliency of the elastic element 7, the bone conduction speaker 2 is brought into appropriate press-contact with the temporal area of the wearer. This makes it possible for the wearer to use the transceiver of this embodiment without any feeling of physical disorder.

The elastic element 7 is also employed in the microphone receiving portion 5 as is in the case of the speaker receiving portion 4 for the same purpose. Namely, in order to prevent the throat microphone 3 from moving relative to the throat or other vibrating body portion of the wearer, the elastic element 7 is disposed between the microphone receiving portion 5 and the throat microphone 3. In shape or contour, the microphone receiving portion 5 corresponds to the throat microphone 3 which is received in the microphone receiving portion 5. The depth of the microphone receiving portion 5 corresponds to the thickness of the throat microphone 3.

The bone conduction speaker 2 and the throat microphone 3 are adhesively fixed to the speaker receiving portion 4 and the microphone receiving portion 5, respectively. Incidentally, although any wiring is not shown in the drawings, appropriate wiring is provided for each of the bone conduction speaker 2 and the throat microphone 3 to extend laterally from each of them through an appropriate cable passage or groove, for example.

On the other hand, the soft tape like carrier 1 is provided with a body contact surface through which the carrier 1 is brought into appropriate press-contact with the wearer. This body contact surface of the carrier 1 forms an adhesive portion 6 with the exception of both the speaker receiving portion 4 and the microphone receiving portion 5. Consequently, the adhesive portion 6 of the soft tape-like carrier 1 of the transceiver is covered with a released paper until the carrier 1 of the transceiver is worn by the user or wearer.

As shown in FIG. 1, in use, the transceiver of the present invention having the above construction is adhesively attached to the skin of the wearer using the adhesive portion 6 of the carrier 1 in a manner such that: the bone conduction speaker 2 is brought into appropriate press-contact with the temporal area immediately behind the ear or in the vicinity of the ear of the wearer; and, the throat microphone 3 is brought into appropriate press-contact with the throat or other vibrating body portion adjacent to the larynx of the wearer.

Consequently, it is possible for the carrier 1 of the transceiver to be entirely brought into appropriate press-contact with the temporal area of the wearer, and therefore stabilized in its mounting position without any feeling of physical disorder. Since the soft tape-like carrier 1 assumes a substantially flat shape, it is hard to recognize the presence of the carrier 1 in use when the carrier 1 assumes skin color. In this case, those who stay at a distance are not capable of recognizing the presence of the carrier 1 worn by the wearer.

Figure 3:
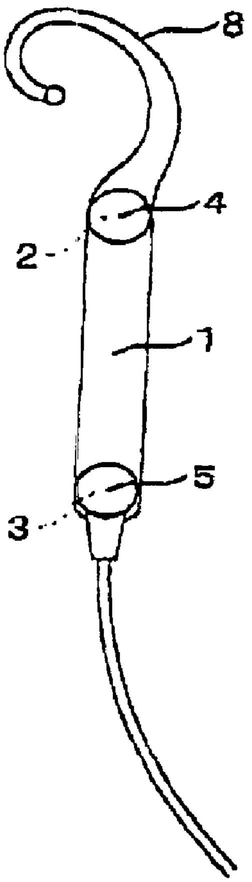
FIG. 3 is a side view of another embodiment of the transceiver of the present invention.

Next, another embodiment of the transceiver of the present invention will be described with reference to FIG. 3. This embodiment is characterized by an ear engaging bend 8 which assumes a hook-like shape. As is clear from FIG. 3, the ear engaging bend 8 is integrally formed with an upper end portion of the speaker receiving portion 4 of the carrier 1 to extend upward, and reaches the ear of the wearer. It is also possible to form the bend 8 as a separate member which is connected to the upper end portion of the speaker receiving portion 4 of the carrier 1. It is possible to improve the transceiver of the present invention in stability of its mounting position in use when the bend 8 is provided in the carrier 1. Further, the bend 8 cooperates with the adhesive portion 6 of the carrier 1 in firmly holding the transceiver in its proper position in use even when the wearer is active in work, sports or the like.

Figure 4:
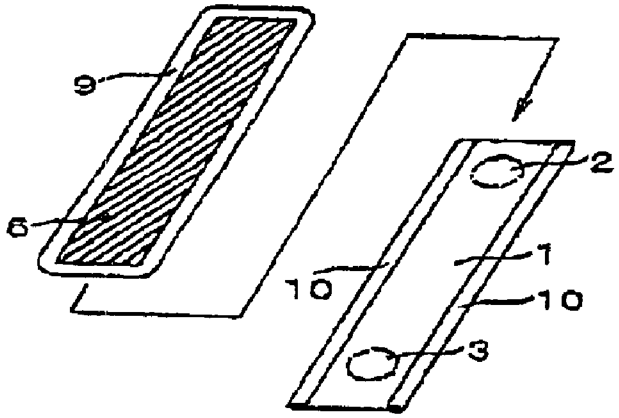
FIG. 4 is a perspective view of further another embodiment of the transceiver of the present invention.
Figure 5:
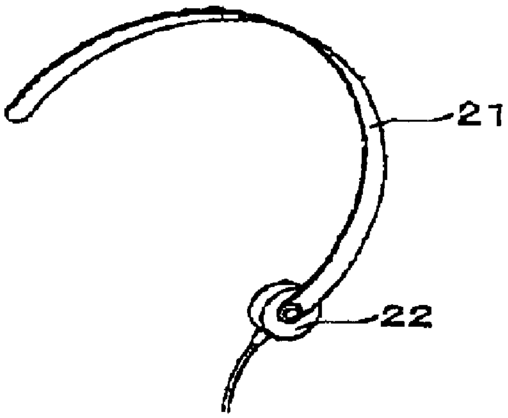
FIG. 5 is a perspective view of a conventional transceiver.
Figure 6:
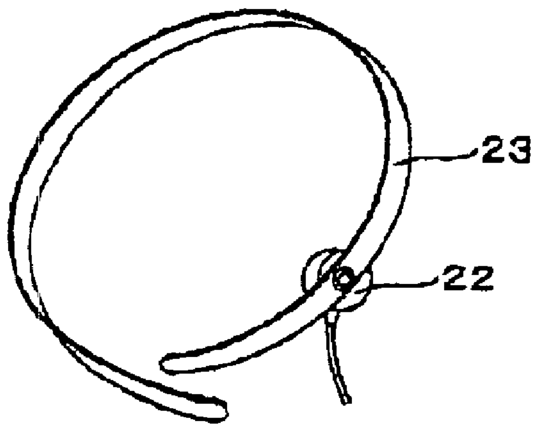
FIG. 6 is a perspective view of another conventional transceiver.
Figure 7:
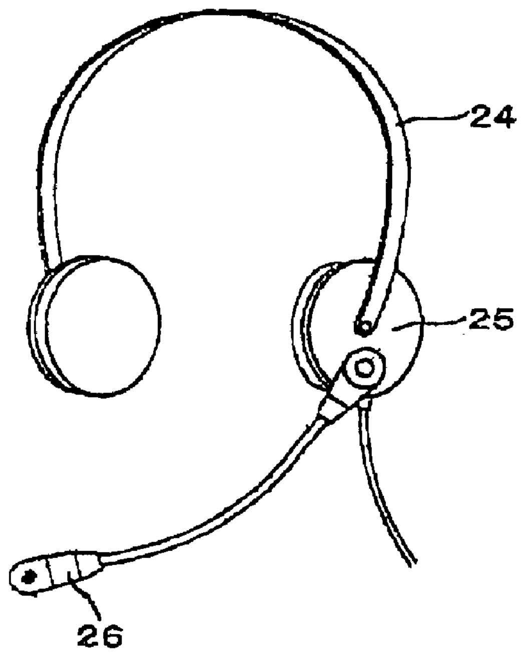
FIG. 7 is a perspective view of further another conventional transceiver.
Figure 8:
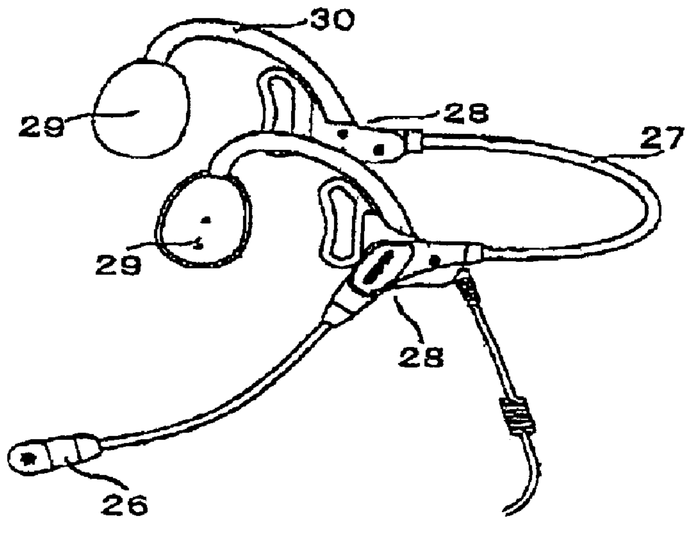
FIG. 8 is a perspective view of still further another conventional transceiver.

FIG. 4 shows further another embodiment of the transceiver of the present invention. In this embodiment, the carrier 1 permits its adhesive portion 6 to be replaced with a new one. More specifically, as is clear from FIG. 4, the carrier 1 has each of its longitudinal opposite side edge portions bent inwardly to form an open-ended engaging portion 10 for detachably receiving an adhesive sheet 9 therein in an insertion manner. The adhesive sheet 9 is provided with the adhesive portion 6 and a marginal portion surrounding the adhesive portion 6, and has a pair of opposite longitudinal side edge portions of its marginal portion be free from any adhesive. These longitudinal side edge portions of the adhesive sheet 9 are slidably received in the engaging portions 10 of the carrier 1 in an insertion manner. Preferably, each of the engaging portions 10 of the carrier 1 has its lower end portion adjacent to the throat microphone 3 closed so as to prevent the adhesive sheet 9 from dropping out of the carrier 1 when the sheet 9 is inserted into the carrier 1.

As described above, by employing the replaceable adhesive sheet 9 in the transceiver of the present invention, it is possible for the transceiver to replace the adhesive sheet 9, which has been used and therefore poor in adhesive properties of its adhesive portion 6, with a new one not used and therefore excellent in adhesive properties of its adhesive portion 6 in use. In this case, the bone conduction speaker 2 and the throat microphone 3 are repeatedly used together with their carrier 1 in a condition in which only the adhesive sheet 9 is periodically replaced with a new one in use. Consequently, the transceiver of the present invention is excellent from the economical point of view.

What is claimed is:

1. A transceiver capable of being connected with a telephone or a radio set, comprising: a bone conduction speaker (2); a throat microphone (3); said bone conduction speaker (2) and said throat microphone (3) fixed on opposite ends of a soft tape-like carrier which has a length and an adhesive along said length sufficient to fix said carrier between a temporal area behind the ear of a wearer or other vibrating body part adjacent to the larynx of the wearer.

2. The transceiver as set forth in claim 1, wherein said soft tape-like carrier (1) is provided with an ear engaging bend (8).

3. The transceiver as set forth in claim 1 or 2, wherein an elastic element (7) is in interposed between said soft tape-like carrier (1) and at least one of said bone conduction speaker (2) and said throat microphone (3).

4. The transceiver as set forth in claim 3, wherein said adhesive (9) is detachably attached to said soft tape-like carrier (1) to allow replacement with a new adhesive.

5. The transceiver as set forth in claim 4, wherein each of opposite longitudinal side edge portions of said carrier is formed into an engaging portion (10) for detachably receiving therein in an insertion manner an adhesive sheet (9) with an adhesive portion (6).

6. The transceiver as set forth in any one of claim 1 or 2, wherein said adhesive (9) is detachably attached to said soft tape-like carrier (1) to allow replacement with a new adhesive.

7. The transceiver as set forth in claim 6, wherein each of opposite longitudinal side edge portions of said carrier is formed into an engaging portion (10) for detachably receiving therein in an insertion manner an adhesive sheet (9) with an adhesive portion (6).

8. The transceiver as set forth in claim 7, wherein a lower end portion of each engaging portion (10) adjacent to the throat microphone is closed.

9. The transceiver as set forth in claim 1, wherein the outer surface of said carrier has a skin color.

10. The transceiver as set forth in claim 1, wherein the opposite ends of the carrier are respectively provided with a receiving portion for the speaker and a receiving portion for the throat microphone.

11. The transceiver as set forth in claim 10, wherein the depth of the receiving portion for the throat microphone corresponds to the thickness of the throat microphone.

12. The transceiver as set forth in claim 1, wherein the carrier is flat between the speaker and the throat microphone.

* * * * *